(12) United States Patent
Shimoozono et al.

(10) Patent No.: US 9,264,628 B2
(45) Date of Patent: Feb. 16, 2016

(54) IMAGING APPARATUS AND FLICKER REDUCTION METHOD

(71) Applicant: JVCKENWOOD Corporation, Yokohama, Kanagawa (JP)

(72) Inventors: Akihito Shimoozono, Kanagawa (JP); Kenji Matsuoka, Kanagawa (JP)

(73) Assignee: JVC Kenwood Corporation, Yokohama, Kanagawa (JP)

( * ) Notice: Subject to any disclaimer, the term of this patent is extended or adjusted under 35 U.S.C. 154(b) by 0 days.

(21) Appl. No.: 14/298,684

(22) Filed: Jun. 6, 2014

(65) Prior Publication Data

US 2014/0375838 A1    Dec. 25, 2014

(30) Foreign Application Priority Data

Jun. 20, 2013 (JP) ................................. 2013-129416

(51) Int. Cl.
    *H04N 5/235*  (2006.01)
(52) U.S. Cl.
    CPC .................................. *H04N 5/2357* (2013.01)
(58) Field of Classification Search
    CPC ..... H04N 5/2357; H04N 5/243; H04N 5/359; H04N 5/357; H04N 5/3572; H04N 5/378; H04N 5/2256
    See application file for complete search history.

(56) References Cited

U.S. PATENT DOCUMENTS

| 2005/0093996 | A1* | 5/2005 | Kinoshita | 348/226.1 |
|---|---|---|---|---|
| 2006/0055823 | A1 | 3/2006 | Kinoshita et al. | |
| 2006/0284992 | A1* | 12/2006 | Kinoshita | 348/226.1 |
| 2007/0013785 | A1* | 1/2007 | Kinoshita et al. | 348/222.1 |
| 2007/0040927 | A1* | 2/2007 | Ishigami et al. | 348/348 |
| 2007/0046789 | A1* | 3/2007 | Kirisawa | 348/226.1 |
| 2008/0303920 | A1* | 12/2008 | Kinoshita | 348/226.1 |
| 2009/0167894 | A1* | 7/2009 | Nakaoka et al. | 348/226.1 |
| 2011/0205394 | A1* | 8/2011 | Fuchigami | 348/226.1 |
| 2012/0002074 | A1* | 1/2012 | Baba et al. | 348/228.1 |
| 2013/0342726 | A1* | 12/2013 | Ebina et al. | 348/226.1 |

FOREIGN PATENT DOCUMENTS

JP      2004-222228 A    8/2004
WO    WO2010-058567 A    5/2010

* cited by examiner

*Primary Examiner* — Aung S Moe
(74) *Attorney, Agent, or Firm* — Procopio, Cory, Hargreaves & Savitch LLP (57) ABSTRACT

An imaging apparatus according to one embodiment of the present invention includes a flicker correction unit for correcting a flicker component using a correction gain. The flicker correction unit includes an integrating unit for calculating a line integrated value from a video signal in one horizontal line in one vertical synchronization period, a normalization unit for normalizing the line integrated value for a plurality of the vertical synchronization periods so as to calculate a normalized line integrated value, an inter-frame DFT processing unit for performing Discrete Fourier Transform on the normalized line integrated value for the plurality of vertical synchronization periods, a flicker component calculation unit for calculating information of a flicker component based on a Fourier Transform processing result, and a correction gain calculation unit for calculating a correction gain based on the information of the flicker component in two or more horizontal lines.

8 Claims, 10 Drawing Sheets

|  | x2 HIGH-SPEED IMAGING | NORMAL IMAGING |
|---|---|---|
| FRAME RATE | 120fps | 60fps |
| FLICKER COMPONENT CYCLE | 6V | 3V |
| FLICKER COMPONENT FREQUENCY | 20Hz | 20Hz |
| DETECTING FLICKER COMPONENT BY PRIMARY DFT COEFFICIENT | PRIMARY DFT 6 POINTS | PRIMARY DFT 3 POINTS |

Fig. 10

IMAGING APPARATUS AND FLICKER REDUCTION METHOD

INCORPORATION BY REFERENCE

This application is based upon and claims the benefit of priority from Japanese patent application No. 2013-129416, filed on Jun. 20, 2013, the disclosure of which is incorporated herein in its entirety by reference.

BACKGROUND OF THE INVENTION

1. Field of the Invention

The present invention relates to an imaging apparatus and a flicker reduction method.

2. Description of Related Art

Japanese Unexamined Patent Application Publication No. 2004-222228 and International Patent Publication No. WO2010/058567 disclose a reduction method of CMOS (Complementary Metal Oxide Semiconductor) flicker. In the flicker reduction method of Japanese Unexamined Patent Application Publication No. 2004-222228, a flicker reduction unit calculates an average value of integrated values of three consecutive fields and normalizes the integrated values by the average value. Then, the flicker reduction unit performs DFT (Discrete Fourier Transform) on the normalized integrated value. The flicker reduction unit estimates a flicker coefficient from a spectrum extracted by DFT and reduces flicker.

In International Patent Publication No. WO2010/058567, an acquisition unit acquires a line integrated value of some of the horizontal lines among horizontal lines constituting one frame. Further, a memory stores the acquired line integration values of a plurality of screens. A flicker extraction unit performs DFT on the line integration value sequence of a plurality of screens and extracts information of a flicker component.

However, in Japanese Unexamined Patent Application Publication No. 2004-222228, a flicker reduction circuit performs DFT processing on signals of one frame. If there is a moving object in a subject, a correction gain rapidly changes, and thus appropriate correction cannot be performed, likely causing destruction of a video. Further, as the DFT processing is performed inside a frame, when there is no flicker component for one cycle inside one frame, it may not be possible to detect flicker in, for example, a high-speed imaging mode.

In International Patent Publication No. WO2010/058567, since normalization unlike Japanese Unexamined Patent Application Publication No. 2004-222228 is not performed, a DC component in a video is not removed. Therefore, as a flicker component detected by brightness of a subject differs even under the same flicker environment, appropriate correction may not be performed. Further, when there is a moving object in the subject, a flicker component acquired by interframe DFT processing rapidly changes. Accordingly, appropriate correction cannot be performed, likely causing destruction of a video.

The present invention has been made in light of the above-described points and an object of the present invention is to provide an imaging apparatus and a flicker reduction method that can appropriately reduce flicker.

SUMMARY OF THE INVENTION

An aspect of the present invention is an imaging apparatus including: an image pickup element that has a different exposure timing according to a horizontal line of a pixel; and a flicker correction unit for correcting a flicker component using a correction gain, in which the flicker component is included in a video signal output from the image pickup element. The flicker correction unit includes: an integrating unit for performing line integration on a video signal in one horizontal line in one vertical synchronization period so as to calculate a line integrated value; a normalization unit for calculating a normalized line integrated value based on the line integrated value for a plurality of the vertical synchronization periods by normalizing the line integrated value; a Fourier transform processing unit for performing Discrete Fourier Transform on the normalized line integrated value for the plurality of vertical synchronization periods; a flicker component calculation unit for calculating information of a flicker component based on a processing result obtained by the Fourier transform processing unit; and a correction gain calculation unit for calculating the correction gain based on the information of the flicker component in two or more horizontal lines.

An aspect of the present invention is a method for reducing flicker of a video signal that is output from an image pickup element having a different exposure timing according to a horizontal line of a pixel, the method includes steps of: performing line integration on a video signal in one horizontal line in one vertical synchronization period so as to calculate a line integrated value; calculating a normalized line integrated value based on the line integrated value for a plurality of the vertical synchronization periods by normalizing the line integrated value; performing Discrete Fourier Transform on the normalized line integrated value for the plurality of vertical synchronization periods; calculating information of a flicker component based on a processing result of the Discrete Fourier Transform; calculating a correction gain based on the information of the flicker component in two or more horizontal lines; and correcting the video signal using the correction gain.

An object of the present invention is to provide an imaging apparatus and a flicker reduction method that can appropriately reduce flicker.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

[First Embodiment]
(Entire Configuration)

Figure 1:
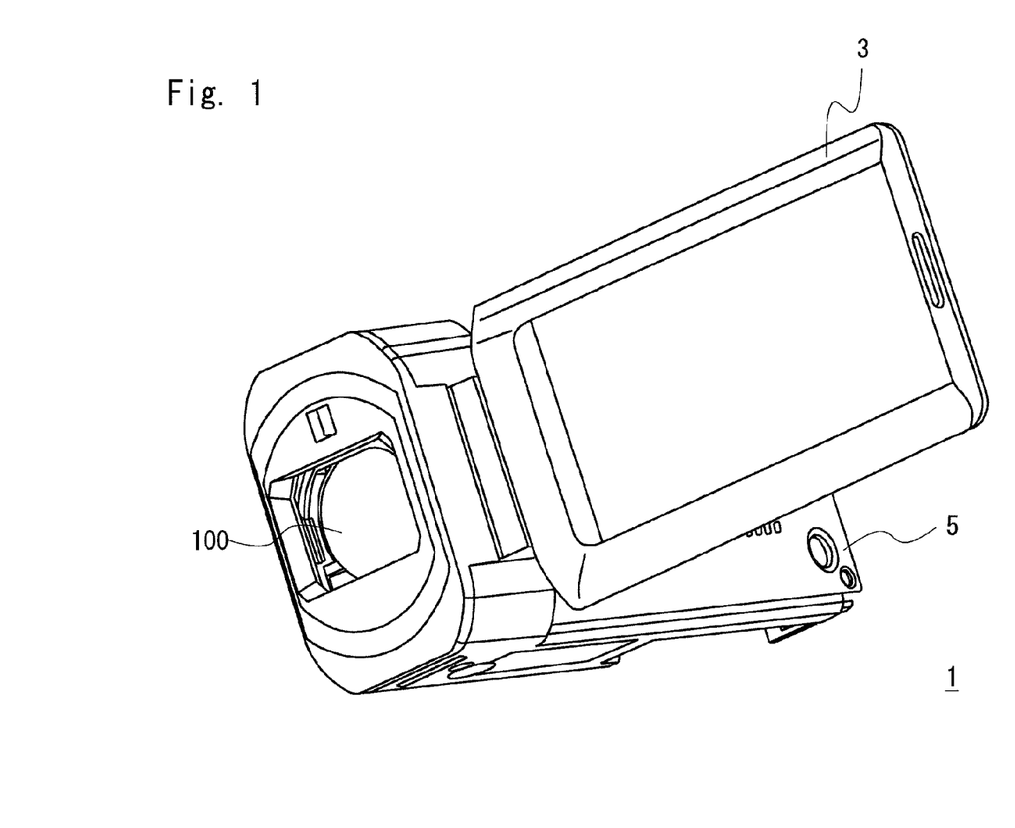
FIG. 1 is a diagram showing an entire configuration of an imaging apparatus according to embodiments.

Hereinafter, an imaging apparatus and a flicker reduction method according to an embodiment of the present invention shall be explained with reference to the drawings. FIG. 1 is a perspective diagram showing an entire configuration of the imaging apparatus according to this embodiment. An imaging apparatus 1 includes a monitor 3, a housing 5, and an imaging unit 100.

The housing 5 includes the imaging unit 100 that is equipped with a CMOS image pickup element, a lens and the like. The imaging unit 100 receives light from a subject and images a moving image and a still image. Further, the housing 5 includes a battery, a built-in memory, a memory card slot, a CPU (Central Processing Unit) and the like that are not shown in the drawings. Predetermined processing is performed on image data obtained by the imaging unit 100, and the image data is stored to a memory. An openable and closable monitor 3 is attached to a side surface of the housing 5. The monitor 3 displays the moving image or the still image obtained by the imaging unit 100.

Figure 2:
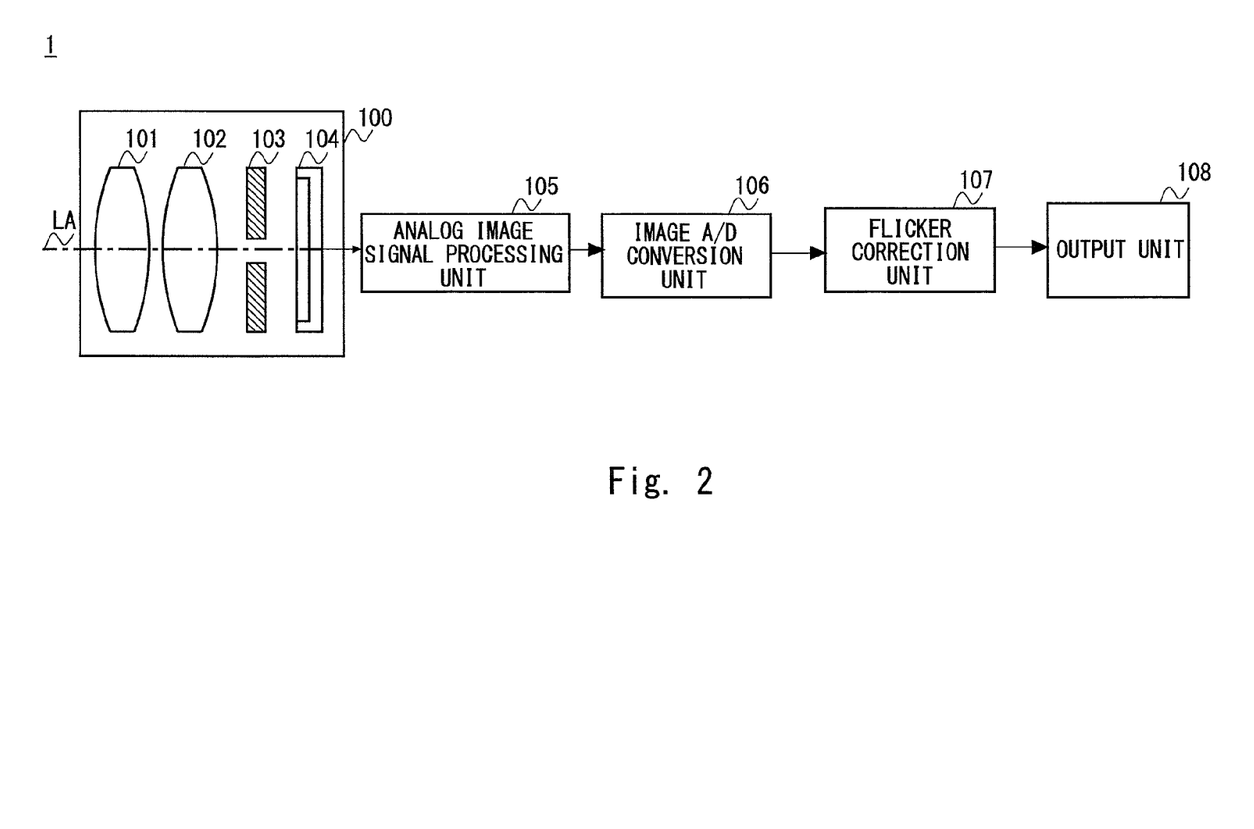
FIG. 2 is a block diagram schematically showing a control system of the imaging apparatus.

Next, a control system of the imaging apparatus 1 shall be explained with reference to FIG. 2. FIG. 2 is a block diagram schematically showing the control system of the imaging apparatus 1. The imaging unit 100 includes a zoom lens 101, a focus lens 102, a diaphragm 103, and an image pickup element 104. The zoom lens 101 moves along an optical axis LA by a zoom actuator, which is not shown. Likewise, the focus lens 102 moves along the optical axis LA by a focus actuator, which is not shown. The diaphragm 103 is driven by a diaphragm actuator, which is not shown. The image pickup element 104 is a CCD (Charge Coupled Device), a CMOS (Complementary Metal Oxide Semiconductor) or the like.

The image pickup element 104 includes a plurality of pixels that are arranged in a matrix. The plurality of pixels operate according to a vertical synchronization signal VD and a horizontal synchronization signal HD. Note that the vertical synchronization signal VD is a pulse signal that determines a start of one field or one frame of the image pickup element 104. For example, image data of a first horizontal line, that is, a first line, is read in synchronization with the vertical synchronization signal VD. A vertical synchronization period, which is one cycle of the vertical synchronization signal VD, is a period corresponding to one frame or one field. The horizontal synchronization signal HD is a pulse signal that determines a start of each scanning line, that is, each horizontal line. The image data is sequentially read out from the plurality of horizontal lines in synchronization with the horizontal synchronization signal HD. Further, when the image pickup element 104 is a CMOS sensor, as an exposure timing differs according to the horizontal line of the pixel, CMOS flicker is generated. It is obvious that the image pickup element 104 is not limited to a CMOS sensor as long as flicker is generated.

The image pickup element 104 converts light having passed through the zoom lens 101, the focus lens 102 and the diaphragm 103 from an optical to electrical signal and thereby generates an analog image signal of the subject. An analog image signal processing unit 105 amplifies the analog image signal, and then an image A/D conversion unit 106 converts the amplified signal to digital image data. Then, the image A/D conversion unit 106 outputs the digital image data to the flicker correction unit 107 as a video signal.

The flicker correction unit 107 performs flicker correction on the video signal and reduces the flicker. That is, the flicker correction unit 107 uses a correction gain to perform the flicker correction on the digital image data. Then, the flicker correction unit 107 outputs the flicker-corrected video signal to the output unit 108. The output unit 108 includes a memory that stores the flicker-reduced video signal. Alternatively, the output unit 108 includes the monitor 3 that displays the flicker-reduced video signal.

Further, the flicker correction unit 107 calculates the correction gain for the flicker correction based on the video signal from the image A/D conversion unit 106. The flicker correction unit 107 performs the flicker correction based on the calculated correction gain. Note that the value of the correction gain differs according to a frame and a horizontal line.

(Flicker Component)

Fluorescent light flicker generated in an NTSC system shall be explained as an example of the flicker. In this example, a case where a frame rate is 60 fps and commercial power supply frequency is 50 Hz shall be explained. Features of the CMOS flicker in this case are:

(1) Flicker is generated for 5/3 cycle in one screen;
(2) A phase changes every line;
(3) Amplitude changes in proportion to brightness of a fluorescent light; and
(4) Flicker can be treated as a sine wave having a frequency (100 Hz), which is twice as great as the commercial power supply frequency (50 Hz).

Figure 3:
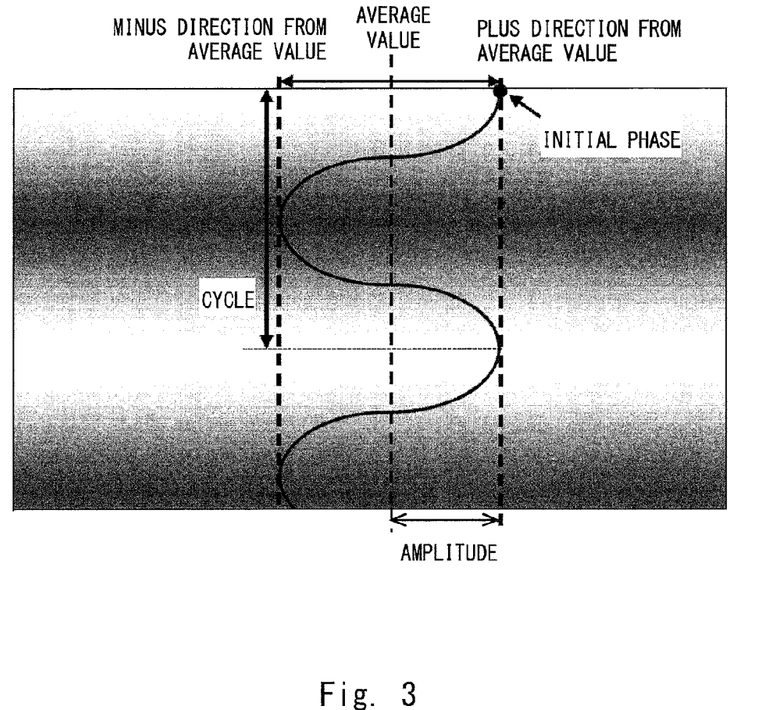
FIG. 3 is an image showing a CMOS flicker component.

With the above-mentioned features, when a CMOS flicker phenomenon occurs, a flicker component as shown in FIG. 3 is generated. Note that in FIG. 3, assume that a screen is scanned from top (an upper part of the screen) to bottom (a lower part of the screen). In the image pickup element 104, as an exposure timing differs from horizontal line to horizontal line, the amount of received light changes according to the horizontal line. Therefore, even when a fluorescent light evenly emits light spatially, as shown in FIG. 3, there are a horizontal line in which the value of the video signal is greater than an average value and a horizontal line in which the value of the video signal is smaller than the average value. For example, in the frame of FIG. 3, the flicker component is the greatest in the top horizontal line in the image, that is, in the first line. Further, the flicker component becomes the greatest in the horizontal line that is shifted by 3/5 of the total number of lines included in one screen. As described above, the flicker component is represented by a sine function having amplitude, a cycle, and an initial phase as shown in FIG. 3. Note that the initial phase is a phase of the first line.

Moreover, a phase of each horizontal line changes according to the frame. That is, the horizontal line in which the value of the video signal is greater than the average value and the horizontal line in which the value of the video signal is smaller than the average value change every frame. In the next frame, a sine wave will be the one with a different initial phase. For example, when fluorescent flicker is generated at 100 Hz and a frame rate of the image pickup element is 60 fps, five cycles of the fluorescent flicker will be the time corresponding to three frames. Accordingly, the initial phase will be the same phase every three frames. As described so far, the flicker component fluctuates according to the horizontal line and frame.

Thus, it is considered that a gain by the flicker component is multiplied by the video signal, thereby deteriorating the video. If a cycle and amplitude of the flicker component and a phase of each line can be obtained, it is possible to correct the CMOS flicker by multiplying the video signal by a gain in a reversed phase of the flicker component. A correction gain for reducing flicker in one frame will have a different value from horizontal line to horizontal line according to a sine wave. Further, the correction gain in the same line will have a different value according to the frame and will have the same value every three frames. It is obvious that the above-mentioned frame rate and the frequency of the fluorescent flicker are an example and not limited to the above-mentioned values.

(Flicker Correction Unit 107)

Figure 4:
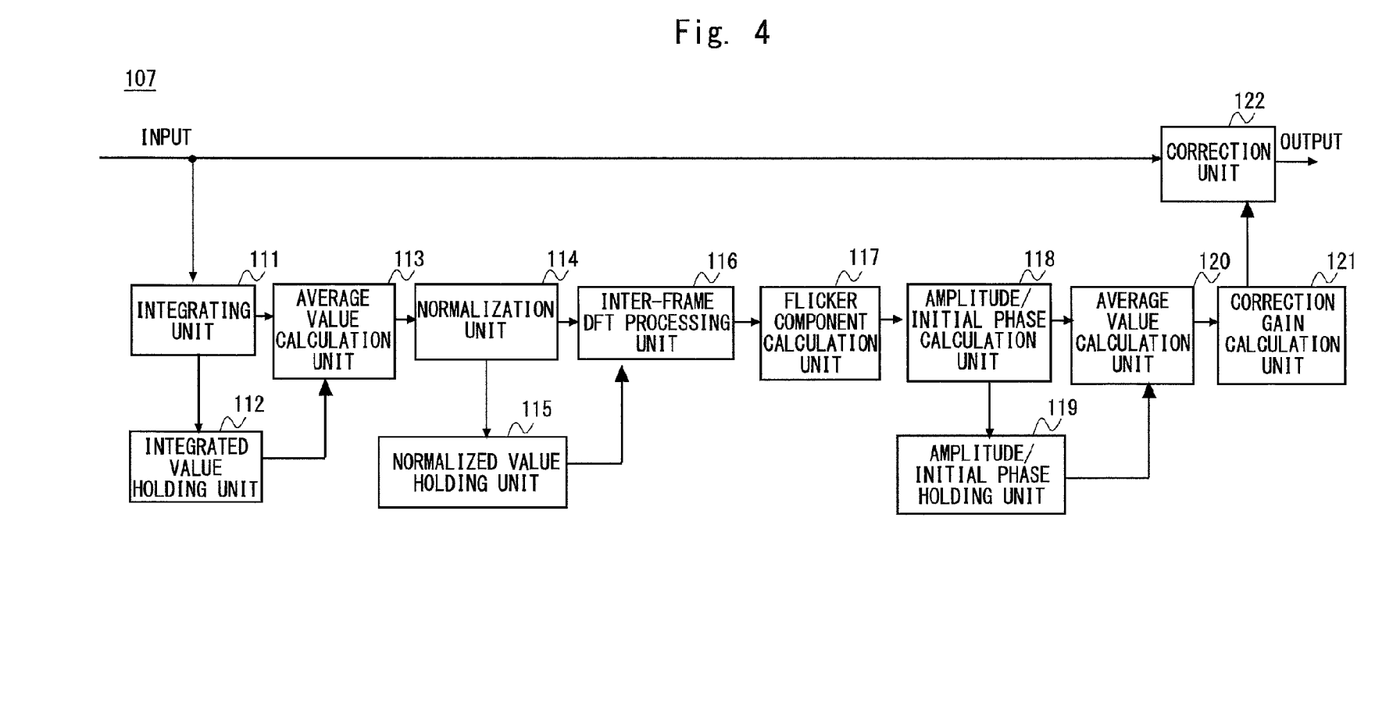
FIG. 4 is a block diagram showing a configuration of a flicker correction unit of the imaging apparatus according to the first embodiment.

Hereinafter, the flicker correction unit 107 shall be explained with reference to FIG. 4. FIG. 4 is a block diagram showing a configuration of the flicker correction unit 107. The flicker correction unit 107 includes an integrating unit 111, an integrated value holding unit 112, an average value calculation unit 113, a normalization unit 114, a normalized value holding unit 115, an inter-frame DFT processing unit 116, a flicker component calculation unit 117, an amplitude/initial phase calculation unit 118, an amplitude/initial phase holding unit 119, an average value calculation unit 120, a correction gain calculation unit 121, and a correction unit 122. The flicker correction unit 107 calculates the correction gain as described above.

A video signal from the image A/D conversion unit 106 is input to the integrating unit 111. The integrating unit 111 performs line integration of the values of the video signals in one frame (in one vertical synchronization period). That is, the integrating unit 111 calculates a total value of the video signals in one horizontal line as a line integrated value. Note that the integrating unit 111 may perform line integration on all pixels in one horizontal line or may perform line integration on some pixels in one horizontal line. The integrating unit 111 outputs the line integrated value to the integrated value holding unit 112. The integrated value holding unit 112 includes a memory or the like that holds the line integrated value calculated by the integrating unit 111. The integrated value holding unit 112 stores the line integrated value for each horizontal line. Accordingly, a plurality of line integrated values are stored to the integrated value holding unit 112. Further, the integrated value holding unit 112 stores the line integrated values for a plurality of frames.

For example, when the frame rate is 60 fps and the commercial power supply frequency is 50 Hz, the phase of the flicker component will be the same every three frames. Accordingly, when the video signal for three frames is used, a signal with no flicker component can be obtained. The integrated value holding unit 112 stores the line integrated values for three frames.

The average value calculation unit 113 calculates an average value of the line integrated values for three frames (three vertical synchronization periods) for each horizontal line. The average value calculation unit 113 outputs the calculated average value to the normalization unit 114. The normalization unit 114 performs normalization based on the average value of the line integration values for three frames and the line integration value of the current frame. That is, the normalization unit 114 performs the normalization by dividing the line integrated value of the current frame by the average value. In this way, the video signal can be normalized, and brightness (a DC component) of the subject itself can be removed from the image including the flicker component.

The normalized line integrated value is held in the normalized value holding unit 115 as a normalized line integrated value. That is, the normalized value holding unit 115 includes a memory or the like that stores the normalized line integrated value. The normalization unit 114 and the normalized value holding unit 115 output the normalized line integrated value to the inter-frame DFT processing unit 116.

The inter-frame DFT processing unit 116 performs Discrete Fourier Transform (DFT) on the normalized line integrated value between the frames. That is, the inter-frame DFT processing unit 116 performs inter-frame DFT processing based on the normalized line integrated value in one line. Specifically, the normalized line integrated value in one line is prepared for m frames (m is an integer greater than or equal to two). As the video signal of a particular horizontal line is repeatedly obtained every one frame period, that is, every one vertical cycle period, the line integrated value and the normalized line integrated value will be data in a time region in time series. Then, the inter-frame DFT processing unit 116 performs the inter-frame DFT processing based on m normalized line integrated values.

Thus, an amplitude spectrum and a phase spectrum in the horizontal line are calculated. That is, the inter-frame DFT processing unit 116 performs Discrete Fourier Transform on the normalized line integrated value in the time region for a plurality of frames (a plurality of vertical synchronization periods), to thereby change the normalized line integrated value into data in a frequency region. The inter-frame DFT processing unit 116 performs the inter-frame DFT processing on the normalized line integrated value, from which the DC component has been removed, in the same line for a plurality of frames. The inter-frame DFT processing unit 116 outputs the amplitude spectrum and the phase spectrum to the flicker component calculation unit 117. In this manner, the inter-frame DFT processing unit 116 performs the inter-frame DFT processing on the normalized line integrated value in one line and calculates the amplitude spectrum and the phase spectrum. Note that by increasing the number of frames, on which the inter-frame DFT processing is performed, it is possible to increase the DFT points. As the frequency resolution can thus be improved, flicker correction can be performed more appropriately. It is obvious that the number of frames (the DFT points), on which the DFT processing is performed, may be determined according to a circuit size of LSI (Large Scale Integration) and the like.

The flicker component calculation unit 117 focuses on a frequency of the flicker component (100 Hz, in this example) between the amplitude spectrum and the phase spectrum and calculates information of the flicker component. For example, the flicker component calculation unit 117 calculates amplitude and a phase at the frequency of the flicker component. It is thus possible to calculate amplitude A of the flicker component and a phase $\theta$ in the frame and in the horizontal line. The flicker component calculation unit 117 outputs the amplitude A and the phase $\theta$ to the amplitude/initial phase calculation unit 118.

The amplitude/initial phase calculation unit 118 calculates an initial phase $\theta$ini based on the phase $\theta$ of a certain line. As a line number converted value, which is obtained by converting the cycle of the flicker component into the number of lines, is already known, it is possible to calculate the phase of the first line, that is, the initial phase $\theta$ini of the frame, based on the phase $\theta$ of the horizontal line, on which the DFT processing has been performed. Specifically, by adding or subtracting the phase θ for a phase value according to the number of lines between the DFT processing line, on which the DFT processing has been performed, and the first line, the initial phase θini can be calculated. The amplitude/initial phase holding unit 119 includes a memory, and the amplitude/ initial phase calculation unit 118 holds the calculated initial phase θini and the amplitude A.

In this manner, as the initial phase, the amplitude, and the cycle of the flicker component can be calculated, it is possible to calculate the correction gain in each line. The correction gain G of each horizontal line can be represented by the following expression (1).

$$G = 1 - A \sin((2\pi Ln)/L + \theta ini) \quad (1)$$

Note that A is the amplitude of the flicker component, Ln is the line number of each line, L is the line number converted value for one cycle of the flicker component, and θini is the initial phase of the corresponding frame. As flicker is generated for 5/3 cycle in one screen, the line number converted value L is a value corresponding to 3/5 of the line number in one screen.

Since each value in the second term on the right-hand side of the expression (1) is calculated from the flicker component and the correction gain must be in the reversed phase of the flicker component, the sign is minus. As for the value of the sine wave, it is preferable to employ a configuration in which a ROM table of the sine wave is prepared and the value is used as a coefficient at the time of reading pixels of the line. By preparing the ROM table, the phases of all horizontal lines can be easily obtained from the initial phase θini. Note that the ROM table of the sine wave may store values for only 1/4 cycle, thereby reducing the circuit size, rather than storing values for one cycle.

By multiplying the video signal by the above-mentioned correction gain in the reversed phase of the flicker component, it is possible to perform the flicker correction. Although a sufficient correction effect can be achieved when a subject remains still, correction accuracy deteriorates when there is a moving object in the subject. This is because when there is a moving object in the subject, the video signal rapidly changes between the frames, and thus the line integrated value of the line greatly changes. As the above-mentioned DFT processing uses the line integrated values for a plurality of past frames, when there is a sudden change in the video signal, periodicity of the line integrated value, which is originally three frames, is instantaneously disordered. As an appropriate flicker component cannot be obtained, the correction gain will not be an optimal value, thereby resulting in incorrect correction and deterioration of the image quality.

Thus, in this embodiment, the number of DFT processing lines, on which the DFT processing is performed, in one frame, is not only one line but a plurality of horizontal lines. That is, information of the flicker component (amplitude and a phase) is extracted for a plurality of the DFT processing lines. Specifically, the average value calculation unit 120 calculates an average value of the amplitude A and the initial phases θini, which have been obtained by performing the inter-frame DFT processing on the normalized line integrated values of the plurality of DFT processing lines.

Accordingly, the integrating unit 111, the integrated value holding unit 112, and the normalization unit 114 perform the above-mentioned processing on each of the plurality of lines that have been extracted from one frame. Further, the integrated value holding unit 112 and the normalized value holding unit 115 hold the line integrated values and the normalized line integrated values for each of the plurality of horizontal lines.

Figure 5:
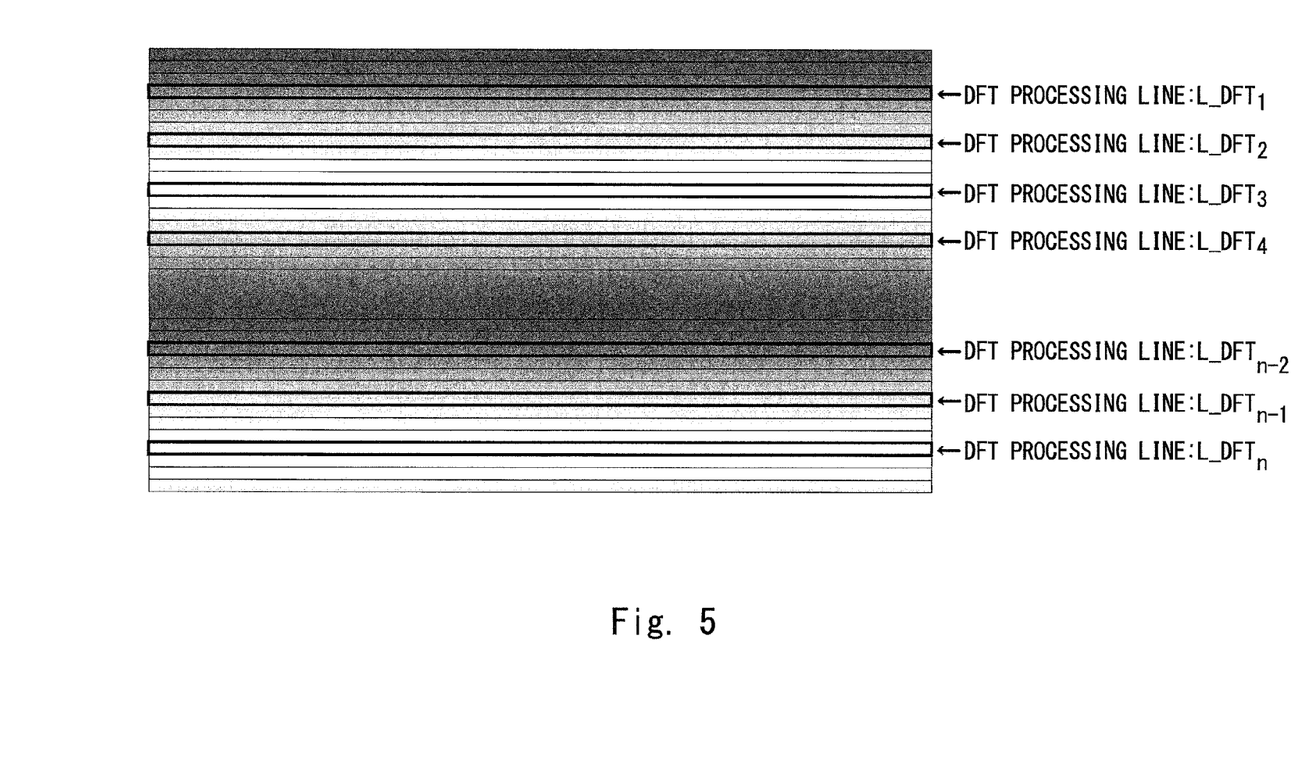
FIG. 5 is a diagram for explaining a DFT processing line in a flicker reduction method.

The inter-frame DFT processing unit 116 performs the inter-frame DFT processing on the normalized line integrated value for each of n horizontal lines (n is an integer greater than or equal to two). For example, as shown in FIG. 5, n horizontal lines, on which the DFT processing is performed, are extracted from one frame. The DFT lines, on which the DFT processing is performed, shall be n lines that are denoted by DFT processing lines L_DFT1 to L_DFTn.

The inter-frame DFT processing unit 116 performs the inter-frame DFT processing on the normalized line integrated value of the DFT processing line L_DFT1 for m frames. Further, the inter-frame DFT processing unit 116 performs the inter-frame DFT processing on the normalized line integrated value of the DFT processing line L_DFT2 for m frames. Furthermore, the inter-frame DFT processing unit 116 performs the inter-frame DFT processing for n times until the DFT processing line L_DFTn. As a result, n amplitude spectra and n phase spectra are calculated.

Moreover, the flicker component calculation unit 117 calculates information of the flicker component for each of the inter-frame DFT processing results. That is, the flicker component calculation unit 117 focuses on the frequency of the flicker component and calculates n amplitude and n phases. Note that in order to distinguish between the calculation results of the respective DFT processing lines, the amplitude and the phase obtained from the DFT result of the DFT processing line L_DFT1 shall be referred to as A1 and θ1, respectively. Similarly, the amplitude and the phase obtained from the DFT result of the DFT processing line L_DFTn shall be referred to as An and θn, respectively.

The amplitude/initial phase calculation unit 118 calculates the initial phase θini based on each of the phases θ1 to θn. For example, the amplitude/initial phase calculation unit 118 calculates initial phase θini-1 by adding or subtracting the phase θ1 for a phase value according to the number of horizontal lines between the first line and the DFT processing line L_DFT1. Similarly, the amplitude/initial phase calculation unit 118 calculates initial phase θini-2 by adding or subtracting the phase θ2 for a phase value according to the number of horizontal lines between the first line and the DFT processing line L_DFT2. When the amplitude/initial phase calculation unit 118 performs this processing on all the DFT processing lines L_DFT1 to L_DFTn, the initial phase θini-1 to initial phase θini-n are calculated. Then, the amplitude/initial phase holding unit 119 stores the initial phase θini-1 to initial phase θini-n and amplitude A1 to An.

The average value calculation unit 120 calculates an average value of the amplitudes A1 to An and an average value of the initial phase θini-1 to initial phase θini-n. Further, the average value calculation unit 120 outputs the calculated average value of the amplitude to the correction gain calculation unit 121 as amplitude A_ave. Similarly, the average value calculation unit 120 outputs the calculated average value of the initial phases to the correction gain calculation unit 121 as an initial phase θini_ave. Then, the correction gain calculation unit 121 calculates the correction gain G from the amplitude A_ave and the initial phase θini_ave. The correction gain G can be calculated by replacing A in the expression (1) by A_ave and replacing θini in the expression (1) by θini_ave. In this manner, the correction gain calculation unit 121 calculates the correction gain G from the average value of the amplitude and the average value of the initial phases for a plurality of lines.

The correction gain calculation unit 121 outputs the calculated correction gain G to the correction unit 122. The correction unit 122 performs the flicker correction using the correction gain G. That is, the correction unit 122 multiples the video signal by the correction gain G of the corresponding horizontal line and outputs the multiplied video signal. As the correction gain G is in the reversed phase of the flicker component, by multiplying the video signal by the correction gain G, it is possible to perform the flicker correction. Then, the flicker correction unit 107 repeatedly performs the above-mentioned processing on the images of the respective frames of a moving image captured by the image pickup element 104, to thereby update the correction gain G.

As described above, in this embodiment, the inter-frame DFT processing unit 116 performs the inter-frame DFT processing on the plurality of horizontal lines. Further, the correction gain calculation unit 121 calculates the correction gain G based on the inter-frame DFT processing results of the plurality of horizontal lines. The average value calculation unit 120 averages the amplitude and the initial phases that are obtained by the inter-frame DFT processing on each horizontal line. It is thus possible to correct the CMOS flicker highly accurately without being influenced by the moving object in the subject.

Moreover, after the DC component is removed from the video signal, the flicker component is calculated. That is, the normalization unit 114 normalizes the video signal by the average value of the video signal between a plurality of frames. Then, the inter-frame DFT processing unit 116 performs the DFT processing based on the normalized line integrated value. It is thus possible to perform highly accurate flicker correction regardless of the brightness of the subject. Accordingly, flicker can be reduced more appropriately than in International Patent Publication No. WO2010/058567.

Moreover, the inter-frame DFT processing unit 116 performs the inter-frame DFT processing using a video signal of a plurality of frames. That is, the inter-frame DFT processing unit 116 performs the inter-frame DFT processing based on the normalized line integrated value of the plurality of frames. Thus, it is possible to perform accurate flicker correction even when there is no flicker component for one cycle in one frame. Even in the high-speed imaging mode where there is no flicker component for one cycle in one frame, it is possible to perform the flicker correction more accurately than in Japanese Unexamined Patent Application Publication No. 2004-222228.

Further, the correction gain calculation unit 121 may include a sine wave table for the correction gain. The correction gain calculation unit 121 may refer to the table and calculate the correction gain G. In the flicker environment, as the sinusoidal flicker components overlap, when the amplitude and initial phase can be calculated, the correction gain calculation unit 121 can easily generate the correction gain G. Even when there is a fluctuation in the initial phase information between a plurality of lines, the sine wave shape of the correction gain can be secured, thereby preventing a mismatch in the shape of the flicker component and the correction gain from being generated.

As for the periodic flicker component which is not a sine wave, the flicker correction unit 107 may prepare a table according to a waveform of the flicker component. As for the flicker component which is not a sine wave, a ROM table may be prepared to support easy calculation of the correction gain G by only changing the ROM table. That is, tables according to the waveforms of the flicker component are prepared in advance, to thereby switch and use the table according to the usage environment.

The number of lines, on which the DFT processing is performed, is not especially limited and can be determined according to a circuit size and performance. Although in FIG. 5, the DFT processing lines L_DFT1 to L_DFTn are arranged at equal intervals every four lines, the number of the DFT processing lines extracted from one frame is not especially limited as long as it is two or greater and the arrangement of the DFT processing lines is not especially limited either.

[Second Embodiment]

Figure 6:
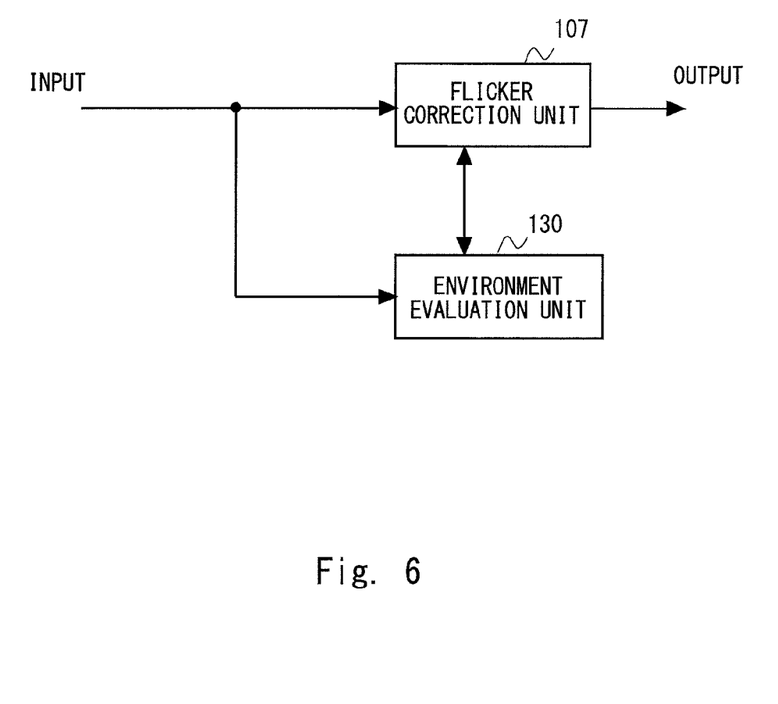
FIG. 6 is a block diagram showing a configuration of a main part of an imaging apparatus according to a second embodiment.

An imaging apparatus and a flicker reduction method according to this embodiment shall be explained using FIG. 6. FIG. 6 is a block diagram showing a part of a control system of the imaging apparatus 1. In this embodiment, in addition to the configuration of the first embodiment, an environment evaluation unit 130 for evaluating whether or not to perform the flicker correction is further provided. Note that an explanation of the overlapping elements in the configurations in the first and second embodiment shall be omitted as appropriate. For example, as the flicker component calculation processing by the flicker correction unit 107 is the same as the one in the first embodiment, an explanation of the flicker component calculation processing shall be omitted.

The environment evaluation unit 130 evaluates whether or not flicker is generated in a usage environment where the image apparatus 1 is used. That is, the environment evaluation unit 130 evaluates whether the usage environment is a flicker environment where flicker is generated or a non-flicker environment where no flicker is generated. The environment evaluation unit 130 outputs a correction control signal according to the evaluation result to the flicker correction unit 107.

The flicker correction unit 107 determines whether or not to perform the flicker correction based on the correction control signal. In the case of the flicker environment, the flicker correction unit 107 performs the flicker correction. In the flicker environment, the flicker correction unit 107 outputs the flicker-corrected video signal. Meanwhile, in the case of the non-flicker environment, the flicker correction unit 107 does not perform the flicker correction. In the non-flicker environment, the flicker correction unit 107 outputs the video signal, on which no flicker correction is performed, as-is.

Figure 7:
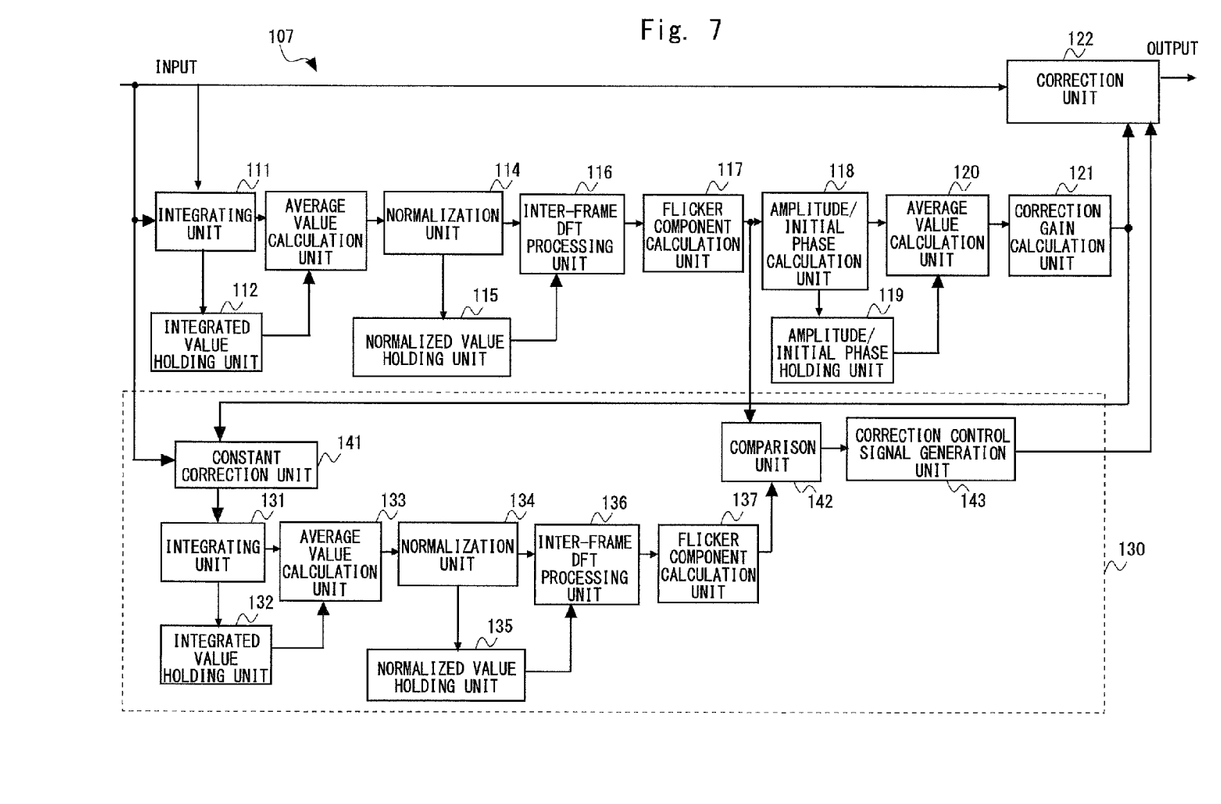
FIG. 7 is a block diagram showing a configuration of an environment evaluation unit of the imaging apparatus according to the second embodiment.

Hereinafter, a configuration of the environment evaluation unit 130 shall be explained using FIG. 7. FIG. 7 is a block diagram showing a configuration of the flicker correction unit 107 and the environment evaluation unit 130. Note that as the flicker correction unit 107 is the same as the one in the first embodiment, an explanation of the flicker correction unit 107 shall be omitted. The environment evaluation unit 130 includes an integrating unit 131, an integrated value holding unit 132, an average value calculation unit 133, a normalization unit 134, a normalized value holding unit 135, an inter-frame DFT processing unit 136, a flicker component calculation unit 137, a constant correction unit 141, a comparison unit 142, and a correction control signal generation unit 143.

A correction gain G from the correction gain calculation unit 121 is input to the constant correction unit 141. Further, a video signal is input to the constant correction unit 141.

The constant correction unit 141 constantly performs the flicker correction on the video signal using the correction gain G. That is, the constant correction unit 141 calculates a value by multiplying the video signal by the correction gain G with no condition. Next, the constant correction unit 141 outputs the flicker-corrected video signal to the integrating unit 131.

The integrating unit 131, the integrated value holding unit 132, the average value calculation unit 133, the normalization unit 134, the normalized value holding unit 135, the inter-frame DFT processing unit 136, and the flicker component calculation unit 137 correspond to the integrating unit 111, the integrated value holding unit 112, the average value calculation unit 113, the normalization unit 114, the normalized value holding unit 115, the inter-frame DFT processing unit 116, and the flicker component calculation unit 117, respectively. Accordingly, the integrating unit 131, the integrated value holding unit 132, the average value calculation unit 133, the normalization unit 134, the normalized value holding unit 135, the inter-frame DFT processing unit 136, and the flicker component calculation unit 137 perform the same processing as the processing performed by the integrating unit 111, the integrated value holding unit 112, the average value calculation unit 113, the normalization unit 114, the normalized value holding unit 115, the inter-frame DFT processing unit 116, and the flicker component calculation unit 117, respectively. The flicker component calculation unit 137 calculates amplitude and a phase of the flicker component of the flicker-corrected video signal. The flicker component calculation unit 137 outputs the calculated amplitude and phase to the comparison unit 142.

Further, the flicker component calculation unit 117 outputs the amplitude and phase of the flicker component to the comparison unit 142. That is, the flicker component calculation unit 117 outputs information of the flicker component of the video signal, on which the flicker correction is not performed, to the comparison unit 142. The comparison unit 142 compares the corrected flicker component from the flicker component calculation unit 137 and the non-corrected flicker component from the flicker component calculation unit 117. Then, the comparison unit 142 outputs a comparison signal according to the comparison result to the correction control signal generation unit 143.

In the flicker environment where flicker is generated, the constant correction in the constant correction unit 141 will be an appropriate correction. Therefore, the flicker component of the video signal, on which the constant correction has been performed, will become smaller than the flicker component of the non-corrected video signal. On the contrary, in the non-flicker environment where no flicker is generated, the constant correction will be an inappropriate correction. Therefore, the flicker component of the video signal, on which the constant correction has been performed, will become greater than the flicker component of the non-corrected video signal.

Figure 8:
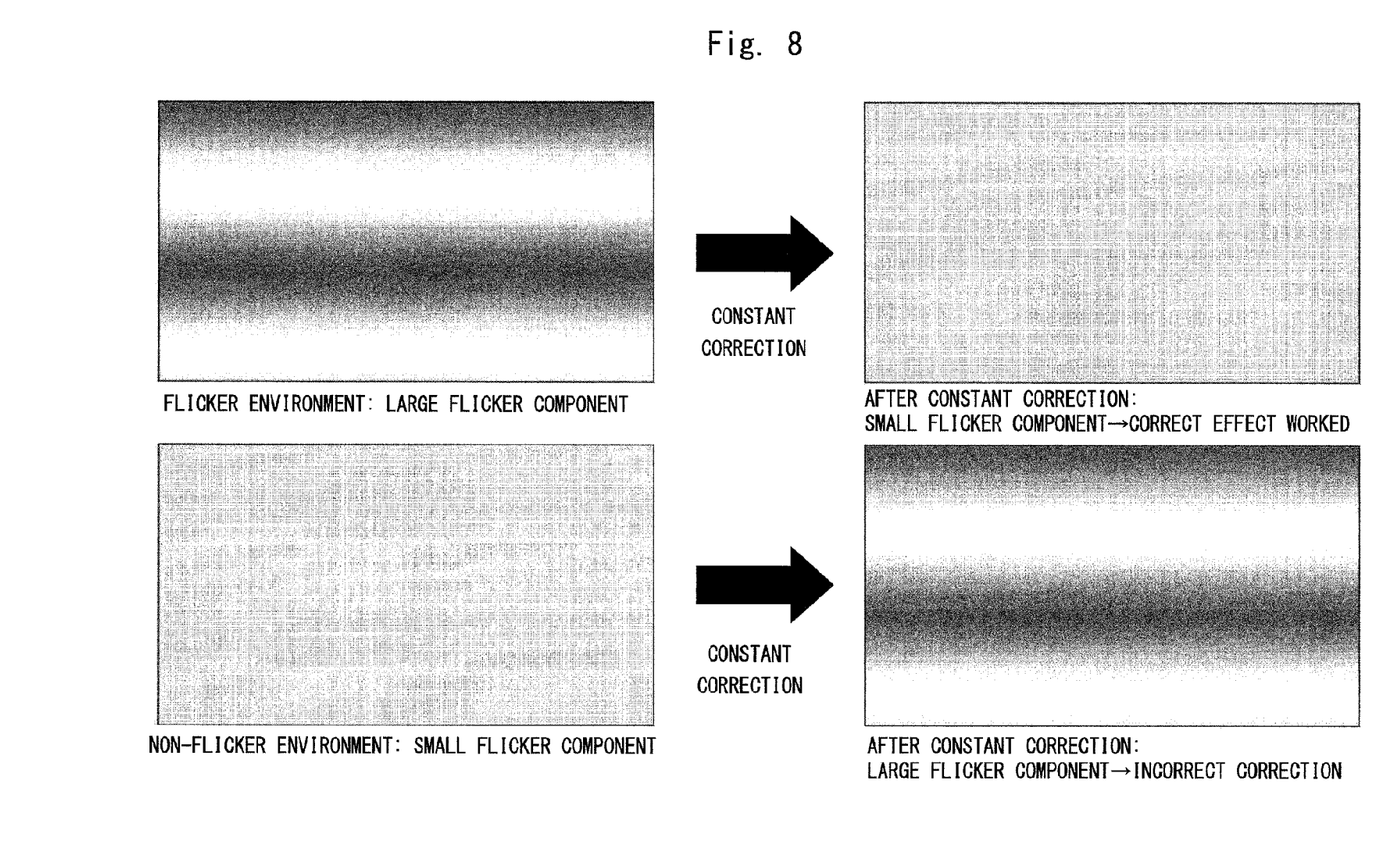
FIG. 8 is a diagram schematically showing images before flicker correction and images after the flicker correction.

FIG. 8 is an image showing existence or absence of the flicker correction in the flicker environment and the non-flicker environment. As shown on the upper left of FIG. 8, the flicker component is large in the flicker environment. When the constant correction is performed on the video signal that has been obtained in the flicker environment, the flicker component will become small as shown in the upper right of FIG. 8. That is, an effect of the correction by the correction unit 122 is that the flicker is reduced.

Meanwhile, in the non-flicker environment, as shown in lower left of FIG. 8, the flicker component is small. Therefore, when the constant correction is performed on the video signal that has been obtained in the non-flicker component, the flicker component will become large as shown in the lower right of FIG. 8. In the non-flicker environment, the constant correction by the constant correction unit 141 will be an incorrect correction. That is, in the non-flicker environment, the correction using the correction gain G will have an adverse effect, thereby emphasizing the flicker component.

As the correction gain G generated by the flicker correction unit 107 is in accordance with the cycle of the flicker component, an inappropriate correction will also be a phase of 3 VD cycles. As a result, when the constant correction unit 141 performs an inappropriate correction, a signal similar to the one in the flicker environment is generated. When the inter-frame DFT processing unit 136 performs the inter-frame DFT processing on the video signal, on which the inappropriate correction has been performed, the flicker component calculation unit 137 detects a large flicker component. For example, amplitude calculated by the flicker component calculation unit 137 will become large.

Accordingly, when the comparison unit 142 compares the size of the flicker component of the corrected video signal and the flicker component of the non-corrected video signal, it is possible to evaluate whether the correction is appropriate or not. Specifically, the comparison unit 142 compares the amplitude calculated by the flicker component calculation unit 117 and the amplitude calculated by the flicker component calculation unit 137. When the amplitude calculated by the flicker component calculation unit 117 is smaller than the amplitude calculated by the flicker component calculation unit 137, the comparison unit 142 evaluates the usage environment as being the non-flicker environment. When the amplitude calculated by the flicker component calculation unit 117 is greater than the amplitude calculated by the flicker component calculation unit 137, the comparison unit 142 evaluates the usage environment as being the flicker environment. In this manner, by comparing the amplitude on which no flicker correction has been performed and the amplitude on which the flicker correction has been performed, it is possible to appropriately evaluate whether the imaging apparatus 1 is used in the flicker environment or the non-flicker environment.

The correction control signal generation unit 143 uses the result of the comparison by the comparison unit 142 for correction control on an actual video. For example, the comparison unit 142 outputs the comparison result to the correction control signal generation unit 143. The correction control signal generation unit 143 outputs a correction control signal indicating whether or not to perform the correction to the correction unit 122. Specifically, when the same comparison result continues for a predetermined number of times, the correction control signal generation unit 143 outputs the correction control signal for switching the correction control to the correction unit 122. Further, the correction unit 122 controls whether or not to perform the flicker correction based on the correction control signal. When the correction is performed, the correction unit 122 outputs the video signal multiplied by the correction gain G. When the correction is not performed, the correction unit 122 outputs the video signal as-is without multiplying the video signal by the correction gain G.

Note that in the case of the non-flicker environment, the amplitude of the correction gain G that is used for the constant correction will be a small value near zero. In such a case, inappropriate constant correction like the one mentioned above cannot be performed. That is, a difference between the flicker component of the video signal, on which the constant correction has been performed by the constant correction unit 141, and the flicker component of the non-corrected video signal will become small. In such a case, the comparison by the comparison unit 142 may not be appropriately performed. Accordingly, it is preferable to employ a configuration in which a minimum amplitude value for the constant correction is determined, and when the amplitude of the correction gain G from the correction gain calculation unit 121 falls below the minimum amplitude value, the correction gain G is replaced by the minimum amplitude value. Thus, it is possible to appropriately perform environment evaluation.

The environment evaluation unit 130 performs constant flicker correction and evaluates whether or not the usage environment is the flicker environment from the result of the constant flicker correction. Therefore, it is possible to accurately evaluate whether or not the usage environment of the imaging apparatus 1 is the flicker environment. In this manner, even when there is coincidentally a moving object having the same frequency component as the fluorescent flicker in the subject, the flicker correction will not be performed incorrectly. Thus, an appropriate flicker correction can be performed.

The environment evaluation unit 130 performs the constant flicker correction on a video signal. The comparison unit 142 compares the flicker component obtained from the result of the constant correction and the flicker component of the video signal before correction. The correction control signal generation unit 143 outputs the correction control signal based on the comparison result. Then, the correction unit 122 uses the correction control signal from the correction control signal generation unit 143 for the correction control on an actual video. Therefore, as it is possible to turn ON/OFF the flicker correction according to the environment, a correction will not be performed incorrectly in the non-flicker environment. Further, in a manner similar to that of the first embodiment, the flicker can be reduced appropriately in the flicker environment.

[Third Embodiment]

In this embodiment, by performing the DFT processing according to the flicker component that differs from frame rate to frame rate, the flicker correction in the high-speed imaging mode is realized. That is, in this embodiment, a function for performing the flicker correction in the high-speed imaging mode is further added to the configuration of the first or second embodiments.

For example, suppose that the frame rate of the image pickup element 104 is variable. When the frame rate of the image pickup element 104 changes, the flicker component of the video signal in one frame changes. When the frame rate is 60 fps, the flicker component for 5/3 cycle is included in one frame, as described above, while when the frame rate is 120 fps, the flicker component for 5/6 cycle is included in one frame.

Figure 9:
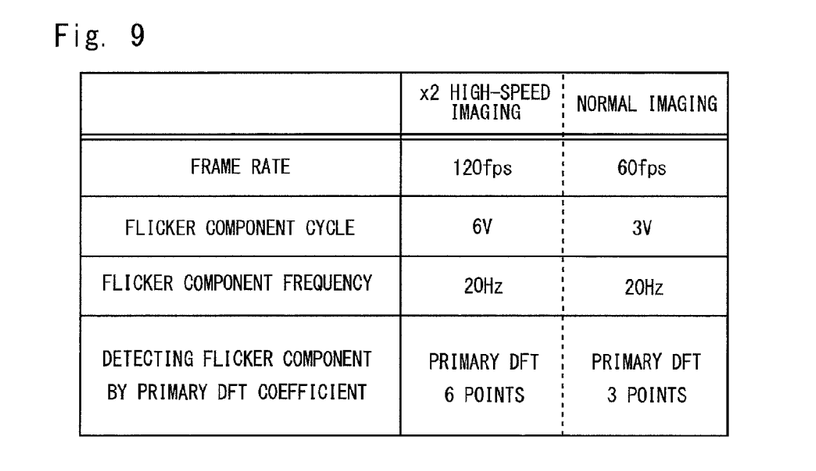
FIG. 9 is a table showing an example of an operation comparison between normal imaging at 60 fps and high-speed imaging at 120 fps.

FIG. 9 shows a comparison of the frame rate and flicker component when 60 fps is the normal imaging mode and 120 fps, which is a speed twice as fast as the normal imaging mode, is the high-speed imaging mode. In the high-speed imaging mode, the cycle of the flicker component changes because of the frame rate which is twice as great as the frame rate in the normal imaging mode. For example, in the normal imaging mode, the initial phase will be the same every 3V (three frames), while in the high-speed imaging mode, the initial phase will be the same every 6V.

Accordingly, as the flicker component detected by the flicker correction unit 107 differs from frame rate to frame rate, the number of integrated frames in the normalization process for removing the DC component changes. For example, in the case of 60 fps, the line integrated values for three frames are required, while in the case of 120 fps, the line integrated values for six frames are required.

As described above, the number of integrated frames necessary for the normalization process of the line integrated values for removing the DC component from the video signal is increased from 3V, which is the normal imaging mode, to 6V. As this leads to an increase in the memory, there is a large influence on the circuit size thereby causing an increase in the manufacturing cost. Further, as the DFT points for detecting the flicker component in the DFT processing also change, DFT processing circuits suitable to the respective imaging modes are required. For example, when the flicker component in both imaging modes is detected by a primary coefficient, there are three DFT points in the normal imaging mode, while there are six DFT points in the high-speed imaging mode. When the number of DFT points in the inter-frame DFT processing changes, there is a large influence on the circuit size, thereby causing an increase in the manufacturing cost. Moreover, in terms of mounting the circuit on LSI, the flicker correction may not be performed at a frame rate other than the frame rate that has been previously designed.

Figure 10:
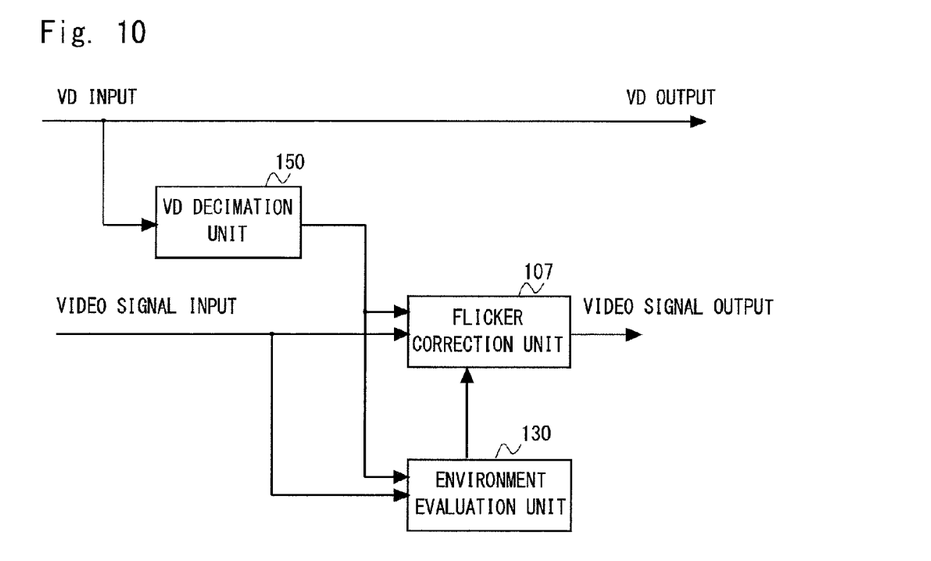
FIG. 10 is a block diagram showing a configuration of a main part of an imaging apparatus according to a third embodiment.

Therefore, in this embodiment, as shown in FIG. 10, a VD decimation unit 150 is added in the imaging apparatus 1. The VD decimation unit 150 decimates the vertical synchronization signal VD of the image pickup element 104 and generates a vertical synchronization signal for the flicker correction. The VD decimation unit 150 outputs the decimated vertical synchronization signal VD to the flicker correction unit 107 and the environment evaluation unit 130. The flicker correction unit 107 and the environment evaluation unit 130 operate based on the decimated vertical synchronization signal VD.

For example, the VD decimation unit 150 decimates, for example, one in two vertical synchronization signals in the high-speed imaging mode of 120 fps based on the normal imaging mode of 60 fps. In this case, the flicker correction unit 107 recognizes the video signal for two frames of the image pickup element 104 as the video signal for one frame. The VD decimation unit 150 decimates the vertical synchronization signals VD so that one in four vertical synchronization signals are in the high-speed imaging mode of 240 fps. The decimated vertical synchronization signal VD (hereinafter referred to as a decimated signal) is transmitted to the flicker correction unit 107 and the environment evaluation unit 130 and used in flicker processing.

Therefore, in the flicker processing, it is possible to perform processing even in the high-speed imaging mode at the same frame rate as that in the normal imaging mode. Note that as the vertical synchronization signal VD, which will be transmitted to a subsequent block of a flicker processing block, is not decimated, there is no influence on the subsequent block. However, a delay equivalent to the one in the flicker processing is adjusted.

Figure 11:
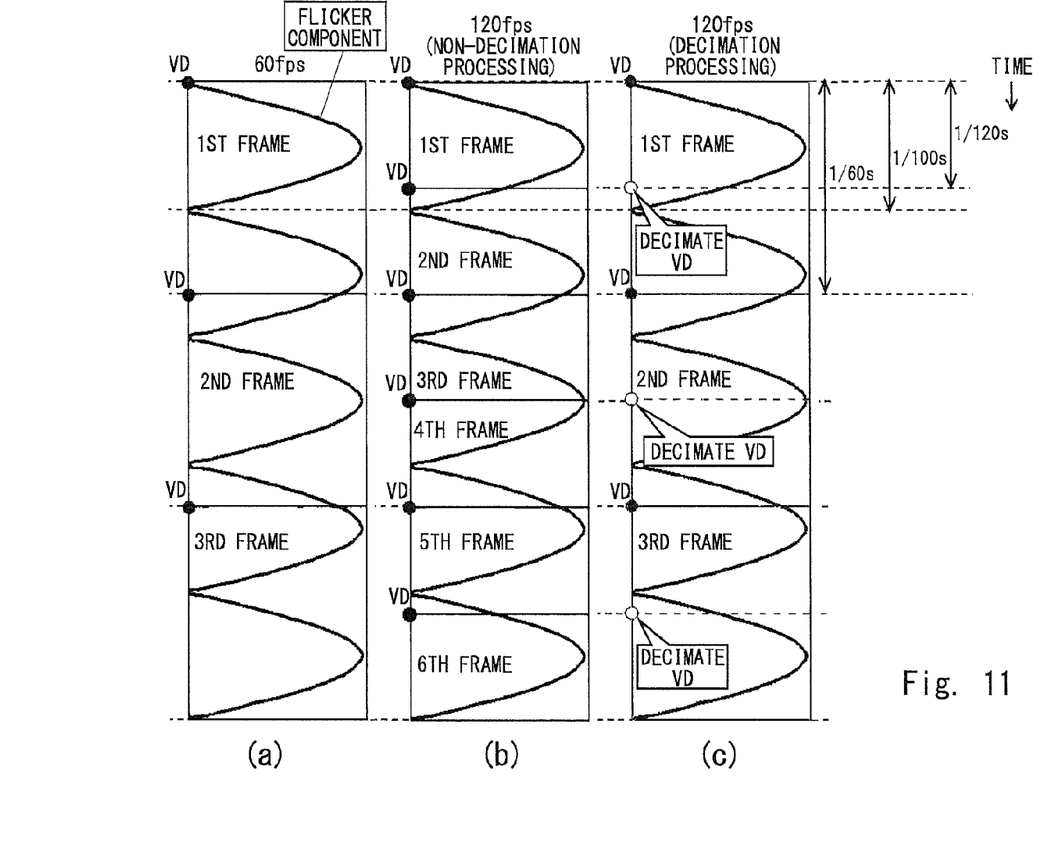
FIG. 11 is a diagram for explaining a relationship between a vertical synchronization signal VD and a flicker component.

FIG. 11 shows three operation comparison examples, in the normal imaging mode at 60 fps, in the high-speed imaging mode at 120 fps where the vertical synchronization signal VD is not decimated (hereinafter referred to as non-decimated processing), and in the high-speed imaging mode at 120 fps where the synchronization signal VD is decimated (hereinafter referred to as decimation processing). In FIG. 11, the normal imaging mode is shown in (a), the high-speed imaging mode in the non-decimation processing is shown in (b), and the high-speed imaging mode in the decimation processing is shown in (c).

As the flicker component cycle in the normal imaging mode is every 3V, the line integrated values for three frames are required to remove the DC component. Meanwhile, in the high-speed imaging mode in the non-decimation processing, as the flicker component cycle is every 6V, the line integrated values for six frames are required. In this case, it is necessary to optimize the circuit. However, in the high-speed imaging mode in the decimation processing, as the flicker component cycle is every 3V, which is the same as the normal imaging mode, the line integrated values for three frames, which is the same as in the normal imaging mode, are required. Even in the high-speed imaging mode, it is possible to perform the common processing like in the normal imaging mode without increasing the circuit size.

The flicker correction unit 107 updates the correction gain G based on the decimated signal and performs the flicker correction. Note that when the number of DFT processing lines in the case of decimating the vertical synchronization signal VD is the same as that in the case of not decimating the vertical synchronization signal VD, the positions of the DFT processing lines in the frame may be the same in both of these cases or may be changed. For example, at 60 fps, when the DFT processing lines are extracted every four lines, at 120 fps, in the first frame of the image pickup element 104, the DFT lines can be extracted every four lines. In this case, the correction gain G is calculated based on the video signal of odd-numbered frames of the image pickup element 104. Alternatively, in the two consecutive frames of the image pickup element 104, the DFT processing lines can be extracted every eight lines. Thus, it is possible to calculate the correction gain G without changing the number of DFT processing lines.

In a high-speed imaging at a frame rate other than 120 fps as described above, an operation similar to the one described above can be possible when the vertical synchronization signal VD is decimated according to the frame rate. Accordingly, the frame rate that can perform the correction will not be determined at the time of the circuit design, and it is thus possible to support any frame rate, thereby improving the performance of the flicker correction. That is, when the VD decimation unit 150 changes the number of decimation, it is possible to perform processing at a frame rate other than 120 fps using the same circuit as the circuit used to perform processing at 60 fps. Specifically, the same circuit as the one used to perform processing at 60 fps can be used to perform processing at a frame rate that is an integral multiple of 60 fps, which is the frame rate in reference processing (in the normal imaging mode).

An object is to achieve a flicker correction that is similar to the one in the normal imaging mode even at a frame rate different from the frame rate in the high-speed imaging mode without increasing the circuit size. Further, an object is to incorporate the above-mentioned flicker correction at any frame rate. Furthermore, effects similar to the ones in the first or second embodiment can be achieved.

The VD decimation unit 150 decimates the vertical synchronization signal VD for the flicker correction. The flicker correction unit 107 operates based on the decimated internal vertical synchronization signal. Thus, it is possible to perform the flicker correction in the DFT processing even in the high-speed imaging, which operates at a frame rate different from the frame rate in the normal frame rate, in a manner similar to that of the normal imaging mode without increasing the circuit size. Only when the VD decimation unit 150 sets the number of decimation of the vertical synchronization signal to be variable, it is possible to support the frame rate which is an integral multiple of the reference processing. Accordingly, it is possible to support a frame rate that is unexpected at the time of circuit design. Only by setting the decimation according to the frame rate, it is possible to support any frame rate. In order to support the frame rate, which is an integral multiple of the reference processing, the case at the lowest frame rate may be the normal imaging mode.

Note that in this embodiment, although the VD decimation unit 150 is provided in the imaging apparatus 1 including the environment evaluation unit 130 of the second embodiment, the VD decimation unit 150 may be provided in the imaging apparatus 1 that does not include the environment evaluation unit 130.

Although the frequency, the amplitude and the phase are used as the information of the flicker component in the explanation of the first to third embodiments, a frequency, power, a phase etc. may be used as the information of the flicker component. It is obvious that the frame rate and the cycle of the fluorescent flicker are not limited to the above-mentioned values.

A part or all of the above processing may be executed by a computer program. The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc Read Only Memory), CD-R (compact disc recordable), CD-R/W (compact disc rewritable), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the invention made by the present inventor has been explained in detail based on the embodiments, it is obvious that the present invention is not limited to the above-described embodiments and various modifications can be made without departing from the scope thereof.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An imaging apparatus comprising:
   an image pickup element that has a different exposure timing according to a horizontal line of a pixel; and
   a flicker correction unit for correcting a flicker component using a correction gain, the flicker component being included in a video signal output from the image pickup element, wherein
   the flicker correction unit comprises:
   an integrating unit for performing line integration on a video signal in one horizontal line in one vertical synchronization period so as to calculate a line integrated value;
   a normalization unit for calculating a normalized line integrated value based on the line integrated value for a plurality of the vertical synchronization periods by normalizing the line integrated value;
   a Fourier transform processing unit for performing Discrete Fourier Transform on the normalized line integrated value for the plurality of vertical synchronization periods;
   a flicker component calculation unit for calculating information of a flicker component based on a processing result obtained by the Fourier transform processing unit;
   a correction gain calculation unit for calculating the correction gain based on the information of the flicker component in two or more horizontal lines; and
   an environment evaluation unit for evaluating whether or not a usage environment of the image pickup element is a flicker environment where flicker is generated,
   wherein when the environment evaluation unit evaluates that the usage environment of the image pickup element is not the flicker environment, the flicker correction unit outputs a video signal, in which the flicker component has not been corrected by the flicker correction unit, the environment evaluation unit calculates the information of the flicker component for the video signal that has been corrected by the flicker correction unit, and the environment evaluation unit evaluates whether or not the usage environment is the flicker environment by comparing the flicker component of the video signal, in which the flicker component has been corrected by the flicker correction unit, and the flicker component of the video signal, in which the flicker component has not been corrected by the flicker correction unit.

2. The imaging apparatus according to claim 1, wherein the correction gain calculation unit calculates the correction gain based on an average value of the information of the flicker component in the two or more horizontal lines.

3. The imaging apparatus according to claim 1, wherein the correction gain calculation unit refers to a value in a table according to a waveform of the flicker component so as to calculate the correction gain.

4. An imaging apparatus comprising:
an image pickup element that has a different exposure timing according to a horizontal line of a pixel; and
a flicker correction unit for correcting a flicker component using a correction gain, the flicker component being included in a video signal output from the image pickup element, wherein
the flicker correction unit comprises:
an integrating unit for performing line integration on a video signal in one horizontal line in one vertical synchronization period so as to calculate a line integrated value;
a normalization unit for calculating a normalized line integrated value based on the line integrated value for a plurality of the vertical synchronization periods by normalizing the line integrated value;
a Fourier transform processing unit for performing Discrete Fourier Transform on the normalized line integrated value for the plurality of vertical synchronization periods;
a flicker component calculation unit for calculating information of a flicker component based on a processing result obtained by the Fourier transform processing unit; and
a decimation unit for decimating a vertical synchronization signal so that the normalization unit normalizes the line integrated value in a constant number of frames when a frequency of the vertical synchronization signal of the image pickup element changes, the decimation unit decimating the vertical synchronization signal wherein the flicker correction unit operates according to the signal decimated by the decimation unit.

5. A method for reducing flicker of a video signal that is output from an image pickup element having a different exposure timing according to a horizontal line of a pixel, the method comprising steps of:
performing line integration on a video signal in one horizontal line in one vertical synchronization period so as to calculate a line integrated value;

calculating a normalized line integrated value based on the line integrated value for a plurality of the vertical synchronization periods by normalizing the line integrated value;

performing Discrete Fourier Transform on the normalized line integrated value for the plurality of vertical synchronization periods;

calculating information of a flicker component based on a processing result of the Discrete Fourier Transform;

calculating a correction gain based on the information of the flicker component in two or more horizontal lines;

correcting the video signal using the correction gain;

evaluating whether or not a usage environment of the image pickup element is a flicker environment where flicker is generated, wherein when the usage environment is evaluated not to be the flicker environment, a video signal, in which the flicker component has not been corrected, is output, wherein the information of the flicker component is calculated for the corrected video signal, and the flicker component of the video signal, in which the flicker component has been corrected, is compared with the flicker component of the video signal, in which the flicker component has not been corrected, so as to evaluate whether the usage environment is the flicker environment.

6. The method according to claim 5, wherein the correction gain is calculated based on an average value of the information of the flicker component in the two or more horizontal lines.

7. The method according to claim 5, wherein the correction gain is calculated by referring to a value in a table according to a waveform of the flicker component.

8. A method for reducing flicker of a video signal that is output from an image pickup element having a different exposure timing according to a horizontal line of a pixel, the method comprising steps of:
performing line integration on a video signal in one horizontal line in one vertical synchronization period so as to calculate a line integrated value;

calculating a normalized line integrated value based on the line integrated value for a plurality of the vertical synchronization periods by normalizing the line integrated value;

performing Discrete Fourier Transform on the normalized line integrated value for the plurality of vertical synchronization periods;

calculating information of a flicker component based on a processing result of the Discrete Fourier Transform;

calculating a correction gain based on the information of the flicker component in two or more horizontal lines;

correcting the video signal using the correction gain; and decimating a vertical synchronization signal so that the line integrated value is normalized in a constant number of frames when a frequency of the vertical synchronization signal of the image pickup element changes, wherein the correction is performed according to the decimated signal.

\* \* \* \* \*